United States Patent
Feldman et al.

(10) Patent No.: US 6,278,696 B1
(45) Date of Patent: *Aug. 21, 2001

(54) COMMUNICATION METHOD AND APPARATUS

(75) Inventors: Howard Ray Feldman, Kenton (GB); Nobuyuki Kawai, Tokyo (JP); Richard Douglas Lane Smith, Malvern (GB); Francois-Arnaud Remael, Pleumeur Bodou (FR)

(73) Assignee: Inmarsat, Ltd. (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,037
(22) PCT Filed: Mar. 29, 1996
(86) PCT No.: PCT/GB96/00751
§ 371 Date: Dec. 22, 1997
§ 102(e) Date: Dec. 22, 1997
(87) PCT Pub. No.: WO96/31040
PCT Pub. Date: Oct. 3, 1996

(30) Foreign Application Priority Data

Mar. 31, 1995 (GB) .................................................. 9506759

(51) Int. Cl.[7] ....................................................... H04B 7/14
(52) U.S. Cl. ........................... 370/278; 370/315; 370/338
(58) Field of Search .................................... 370/315, 325, 370/327, 346, 276, 277, 278, 279, 282, 338, 328, 329

(56) References Cited

U.S. PATENT DOCUMENTS

| 3,825,899 | 7/1974 | Haeberle et al. . |
| 4,307,461 | 12/1981 | Brickman . |
| 4,601,035 | 7/1986 | Marzec . |
| 4,922,487 | 5/1990 | Eilenberger . |
| 4,926,416 | 5/1990 | Weik . |
| 4,985,895 | 1/1991 | Pelkey . |
| 4,995,076 | 2/1991 | Joffe . |
| 5,172,375 | * 12/1992 | Kou ...................................... 370/324 |
| 5,430,732 | * 7/1995 | Lee et al. ............................. 370/346 |
| 5,485,464 | * 1/1996 | Strodtbeck et al. ................. 370/346 |

FOREIGN PATENT DOCUMENTS 0 503 207   9/1992 (EP) .

* cited by examiner

Primary Examiner—Ricky Ngo
(74) Attorney, Agent, or Firm—Banner & Witcoff, Ltd.

(57) ABSTRACT

An interface between a data terminal and a digital communications link implements protocols and frame formats designed to reduce delays in a data communication with a remote terminal. The interface overcomes the need to send or receive an HDLC SABME or UA control signal for establishing an asynchronous balanced mode, and allows data to be sent over the digital communications link as soon as the communication parameters are established. In a non-ARQ (error correction) mode, the interface sends control signals and data over the communications link in frames subdivided into many small subframes of fixed length, each subframe having a length code indicating an amount of valid information but without CRC, address or control information. The interface, when arranged for connection to the data terminal through a telephone network, encodes call progress signals from the telephone network for sending over the digital communications link. The interface encodes and decodes interrupt signals for sending between the data terminal and the digital communications link when an interrupt signal is detected.

11 Claims, 11 Drawing Sheets

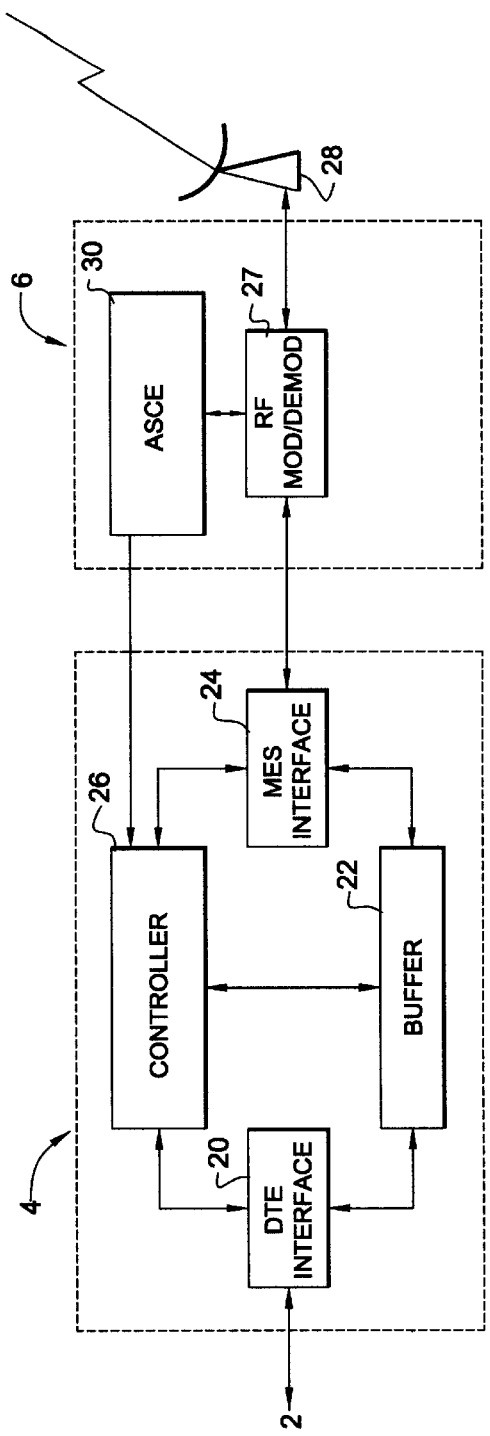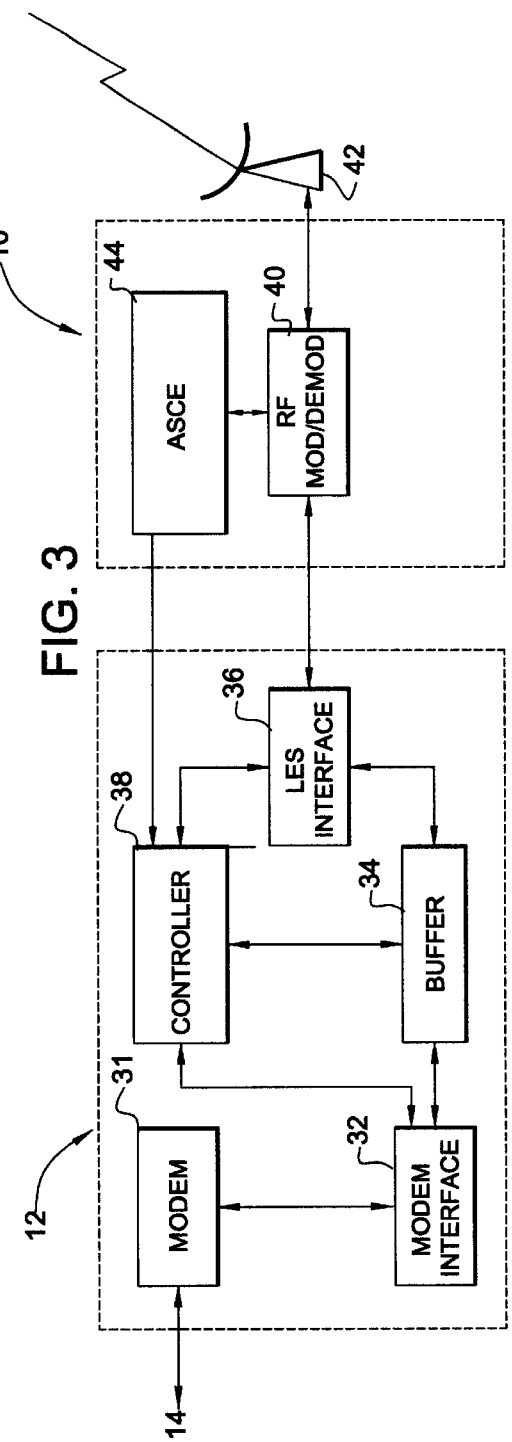

COMMUNICATION METHOD AND APPARATUS

TECHNICAL FIELD

The present invention relates to a data communication method and apparatus for use in radio frequency communications and in particular, but not exclusively, to an interface for connecting a data terminal, either directly or indirectly, to a digital radio frequency communications link.

BACKGROUND ART

One example of a radio-frequency communications link for use in connecting data terminal equipment (DTE) is an asynchronous data service proposed for the INMARSAT-B™ or INMARSAT-M™ satellite communications system, as described for example in Chapters 12 and 14 of "Satellite Communications: Principles and Applications" by Calcutt and Tetley, 1st edition, published by Edward Arnold.

The overall layout of the satellite communications system, when used for data communications, is shown in FIG. 1. A mobile DTE 2 is connected via an RS232C interface to a modem interface unit (MIU) 4. The MIU 4 simulates a Hayes-compatible modem and is able to decode Hayes-type commands from the mobile DTE 2, so that off-the-shelf communications software may be used in the mobile DTE 2. The MIU 4 does not perform modulation or demodulation in this case, since it is not connected to an analog line. Instead, the MIU 4 provides an interface to a mobile earth station (MES) 6 which allows communication via a satellite 8 to a fixed or land earth station (LES) 10. The LES 10 is connected to an LES MIU 12 which interfaces the satellite link to a public switched telephone network (PSTN) 14 and therefore functions as a modem to convert analog signals on the PSTN 14 to digital signals on the satellite link, and vice versa. A fixed DTE 18 is connected to the PSTN 14 through a modem 16 of standard type. Alternatively, the LES MIU 12 may be connected to the fixed DTE via an ISDN and an ISDN adapter, or via another type of network allowing data to be sent in another format.

FIG. 2 shows the MES MIU 4 and the MES 6 in greater detail. The MES MIU 4 comprises a DTE interface 20, which provides an RS232 physical interface and emulates an AT.PCCA type modem, i.e. it complies with the minimum functional specification for data transmission systems published by the Portable Computer and Communications Association (PCCA), including the use of the AT command set and responses.

Data received by the DTE interface 20 is sent to a buffer 22, which is in turn connected to an MES interface 24. The MES interface 24 implements, in ARQ (automatic repeat request) mode, a variant of the HDLC (High Level Data Link Control) protocol, as defined in ISO recommendations ISO/IEC 3309, ISO/IEC 4335: 1993 and ISO/IEC 7809: 1993. The particular version employed is ISO HDLC BAC 3.2, 4, 8, 10, 12 as defined in ISO 7809: 1993 (synchronous, two-way simultaneous, duplex, non-switched). A controller 26 controls the operation of the interfaces 20 and 24 and the flow of data through the buffer 22.

The MES includes an RF modulator/demodulator 27, connected to an antenna 28, for RF modulating the output of the MES interface 24 and transmitting the output through the antenna 28 to the satellite 8, and for RF demodulating RF signals received from the satellite 8 through the antenna 28 and sending the demodulated signals to the MES interface 24. The MES 6 also includes access control and signalling equipment (ACSE) 30, for setting up and clearing the satellite link, which exchanges data with the controller 26 of the mobile MIU 4.

The MES ACSE 30 communicates with a network control station (NCS) which allocates communications channels and supervises communications traffic through the satellite 8 and communicates with further ACSE at the LES.

The mobile MIU 4, MES 6 and ACSE 30 may be integrated in a mobile unit and the antenna 28 may be integrated or connected externally with the mobile unit.

FIG. 3 shows the LES 10 and the LES MIU 12 in greater detail. The LES MIU 12 includes a modem 31 for demodulating analog signals from the PSTN 14 and modulating digital signals for the PSTN 14, and a modem interface 32 which supports modem protocols such as V.42 error correction, for communication with the modem 16. If the PSTN 14 is a digital network, a suitable interface is used instead of the modem 30.

The modem interface 32 is connected through a buffer 34 to an LES interface 36, which implements protocols compatible with the MES interface 24, so that data can be exchanged between the LES MIU 12 and the MES MIU 4. A controller 38 supervises the operation of the modem interface 32, buffer 34 and LES interface 36. The LES interface 36 is connected to an RF modulator/demodulator 40 which modulates signals for transmission to the satellite 8 through an antenna 42, and demodulates signals received from the satellite 8 though the antenna 42. Call set-up and clearing are controlled by an LES ACSE 44 within the LES 10 which exchanges signals with the LES MIU 12, the MES ACSE 30, and the network control station (NCS).

EXAMPLE

An example of data communication between the mobile DTE 2 and the fixed DTE 18 using the INMARSAT-M™ system will now be described with reference to FIG. 4.
Call Set-up In this example, the mobile DTE 2 initiates a call by sending the code AND (dial) 46 to the MES MIU 4, which sends a dialling indication 48 to the MES ACSE 30. A call is then set up during the period 50 by exchanging call set-up signals between the MES ACSE 30, the LES ACSE 44 and the network control station. When the call has been set up on the satellite link, a dialling signal 52 is sent from the LES ACSE 44 to the LES MIU 12, which dials the requested number using a dialling sequence 54 over the PSTN 14. The modem 16 sends a ringing indication 56 to the fixed DTE 18, and the PSTN 14 sends a ringing tone 58 to the LES MIU 12. The LES MIU 12 sends a Ringing line control message (LCM) 60 to the MES MIU 4, which in turn sends a ringing indication 62 to the mobile DTE 2 to indicate that the call has been successfully set up.

A line control message (LCM) typically requires a response from the MIU that receives it. The response may either be another LCM or an echo of the original LCM, if no response is available.
Training The parameters of the call must now be established. The MES MIU 4 sends an establish line control message (LCM) 64, which requests options to be supported, to the LES MIU 12. The parameters requested in the Establish LCM 64 are:

(i) satellite/PSTN ARQ or non-ARQ (Automatic Repeat Request)

(ii) Maximum data rate (iii) 7 or 8 bit data (iv) 1 or 2 stop bits (v) Odd, even or no parity Options (iii) to (v) relate to the data format to be used in the link between the mobile DTE 2 and the MES MIU 4 and between the LES MIU 12 and the fixed DTE 18. ARQ mode can be set independently in (i) for the satellite link and PSTN link.

The fixed DTE 18 responds to the ringing indication 56 with an ATA (answer) signal 66. The modem 16 sends an answer signal 68 to the LES MIU 12, which causes a connect signal 70 to be sent to the LES ACSE 44, the MES ACSE 30 and the MES MIU 4.

Next, the LES MIU 12 attempts to establish a reliable data rate for communication with the fixed DTE 18 by means of a training sequence 76. For example, the LES MIU 12 sends a test signal at 2400 bit/s and detects whether the test signal is confirmed by the modem 16. If it is not confirmed, a test signal is sent at 1200 bit/s and the LES MIU 12 awaits confirmation from the modem 16. If no confirmation is received, training is unsuccessful and the call cannot proceed.

If training is successful, the LES MIU 12 sends to the MES MIU 4 a Connect LCM 80, which indicates the data rate at which training was successful and confirms satellize/PSTN ARQ/non-ARQ modes, and the modem 16 sends a connect indication 78 to the fixed DTE 18. In response to the Connect LCM 80, the MES MIU 4 sends a connect indication 82, including the call parameters, to the mobile DTE 2.

Then the LES MIU 12 sends an HDLC SABME (Set Asynchronous Balanced Mode Extended) signal 84, which is required under the HDLC protocol to establish HDLC Asynchronous Balanced Mode, to the MES MIU 4. The MES MIU 4 responds with an HDLC UA (Unnumbered Acknowledge) signal 86, to indicate that the HDLC SABME signal 84 has been received and data transfer may now take place.

Data Transfer

Any data which has already been sent by the mobile DTE 2 in response to the connect indication 82 is buffered in the MES MIU 4 until the HDLC UA signal 86 has been sent, and any data already sent by the fixed DTE 18 is buffered in the LES MIU 12 until the HDLC UA signal 86 has been received. Data transfer 88 occurs between the MES DTE 2 and the MES MIU 4 through the RS232 link. Data transfer 90 occurs between the MES MIU 4 and the LES MIU 12 through the satellite 8 as 8-bit data, with start, stop and parity bits having been removed by the local MIU.

In 7-bit mode, an extra zero is inserted to fill out each byte to 8 bits over the satellite link, and is removed by the MIU which receives the data.

Data 92 is sent over the PSTN 14 and corresponding data 94 is exchanged between the modem 16 and the fixed DTE 18.

Data is buffered in the MIUs to accommodate differences in data rates and non-synchronous operation between the MES DTE 2 and the fixed DTE 18.

Call Clearing

At the end so a data call, the MES DTE 2 sends an ATH (Hang Up) signal 96 to the MES MIU 4, which in turn sends a call clearing signal 98 to the MES ACSE 30. The MES ACSE 30 signals channel release 100 to the LES 10 and the channel is cleared (not shown) by the network control station. A clearing indication 102 is sent by the LES ACSE 44 to the LES MIU 12, which sends a call-clearing indication 104 to the modem 16. Finally, the modem 16 sends a clearing indication 106 to the fixed DTE, and goes on-hook.

Fixed Originated Calls

In a call originated by the fixed DTE 18, as shown in FIG. 5, the flow of signals shown in FIG. 4 is substantially reversed. Corresponding reversed signals are given the same references as in FIG. 4, but are dashed. Corresponding non-reversed signals are given the same references as in FIG. 4.

Call Set-up

Fixed DTE 18 initiates the call by sending an ATD signal 46' to the modem 16, which sets up a call at 108 to the LES MIU 12. A call set up indication 48' is sent from the LES MIU 12 to the LES ACSE 44 and a satellite channel is set up at 50'. Once a data mode has been set up on the satellite channel, a ringing signal 110 is sent from the MES ACSE 30 to the MES MIU 4, which sends a ringing indication 56' to the mobile DTE, and a ringing signal 112 is sent from the LES ACSE 44 to the LES MIU 12, which sends a ringing tone 114 to the modem 16, causing the modem 16 to send a ringing indication 116 to the fixed DTE 18.

In response to the ringing indication 56', the mobile DTE 2 sends an ATA signal 66' to the MES MIU 4, which sends an off-hook indication 118 to the MES ACSE 30. A connect signal 120 is sent from the MES ACSE 30 to the LES ACSE 44, which sends a connect signal 122 to the LES MIU 12.

Training

After sending the off-hook indication 118, the MES MIU 4 sends an Establish LCM 64 to the LES MIU 12, which signal is similar to the Establish LCM 64 in the example shown in FIG. 4.

In response to receipt of the Establish LCM 64, the LES MIU 12 trains the modem 16 at 76, as in the example of FIG. 4.

When training is complete, the modem 16 sends a connect indication 78 to the fixed DTE 18 and the LES MIU 12 sends a connected indication 70 to the LES ACSE 44, followed by the Connect LCM 80 to the MES MIU 4, to indicate the rate at which training was successful. In response to receipt of the Connect LCM 80, the MES MIU 4 sends a connect indication 82 to the mobile DTE 2. To complete the training sequence, the LES MIU 12 sends the HDLC SABME signal 84 to the MES MIU 4, which responds with the HDLC UA 86, as in the FIG. 4 example.

Data Transfer

Data transfer 90 may now take place over the satellite link. Data transfer 88, 92 and 94 may already have begun, in which case the data will be buffered at the local MIU.

Call Clearing

When data transfer is complete, the fixed DTE 18 sends an ATH signal 96' to the modem 16 and call clearing proceeds in the reverse direction to that shown in FIG. 4, except that the MES MIU 4 signals the end of the call by indicating "NO CARRIER" 124 to the mobile DTE 2.

Signal Formats

The format of signals exchanged between the MES MIU 4 and the LES MIU 12 will now be explained with reference to FIG. 6. Signals are transmitted on an RF channel with a single channel per carrier (SCPC). The signal commences with a header porzion P, followed by a variable number of fixed-length SCPC frames $SM_1$, $SM_2$ ... $SM_n$. The end of the signal is indicated by an end portion E.

Each SCPC frame SM is subdivided into four sections, each containing a header $H_1$, $H_2$, $H_3$, $H_4$, a data field $D_1$, $D_2$, $D_3$, $D_4$, and dummy bits (shaded). The data fields $D_1$ and $D_2$ together form one or more HDLC frame, which is repeated in the data fields $D_2$ and $D_4$, to increase the energy per bit. The contents of each HDLC frame depend on whether data or control information is being sent.

If data is being sent, the HDLC frame has an information (I) format shown in FIG. 7, formed from the concatenated data fields $D_1$ and $D_2$. The data is headed by a packet length byte L, which indicates the length of valid data in the HDLC frame.

There then follows an address byte A, two control bytes C and data I to the length indicated by the packet length byte L. The HDLC frame ends with a cyclic redundancy check CRC. Any unused bytes following the CRC are filled with random data. The data I is only accepted by the receiving MIU if the CRC is valid. In ARQ mode, the receiving MIU requests re-sending of invalid HDLC frames, while in non-ARQ modes the invalid HDLC frames are discarded.

The control bytes C include acknowledgement and frame number information indicating the sequence number of the transmitted frame and the sequence number of the last frame received correctly.

Line control messages are sent as unnumbered information (UI) HDLC frames, of a format shown in FIG. 8. Each unnumbered information (UI) frame consists of a packet length byte L, an address byte A, a control byte C, an optional information field I and a two-byte CRC. Further HDLC frames may follow, with the last HDLC frame being terminated by hex FF and the remaining available bytes being felled with random bits. The line control parameters are encoded in the control byte C and optional information field.

A supervisory (S) HDLC frame format is also used for flow control messages, but this format is not relevant as background to the present invention.

However, the above data communications system has not been implemented and the inventors have identified the following problems in the implementation of data communications systems of the type exemplified above.

Delay

As can be seen from FIGS. 4 and 5, a delay occurs between the receipt of the connect indication 82 and the receipt of data at 88, by the MES DTE 2. The expected data may already have been sent by the fixed DTE 18, but would be buffered at the LES MIU 12. Likewise, there may be a considerable delay between receipt of the connect indication 78 by the fixed DTE 18 and the receipt of data at 94 by the fixed DTE. The expected data may already have been sent by the mobile DTE 2, but will be buffered at the MES MIU 4 until the HDLC UA 86 has been sent.

In many protocols operated in DTEs, a timer is set upon receipt of a connect indication and, if there is a long delay before data is received, the timer may time out and terminate the call. One such protocol is PPP, which is used for Internet dial-in services. These protocols cannot usually be modified by the user. Therefore, such protocols appear unsuitable for use with a communications link of the type described above.

In the protocol described above, it is assumed that the Connect LCM 80 is correctly received by the MES MIU 4. If it is not, the call will fail.

Considerable delays may occur in the link between the MES MIU 4 and the LES MIU 12. The data generated by a DTE must be formatted by the local MIU into the frame formats described above, which incurs a delay because the data for a whole frame must be received before the length and CRC information can be calculated and the frame transmitted. The delay is equal to one frame duration, which is 240 ms in the above example. The receiving MIU cannot begin to pass the data on until a complete SCPC frame is received and the CRC and length information can be checked. This incurs a further delay of one frame duration. The formatting and urformatting therefore incur approximately ½ second delay in either direction. These delays are in addition to processing delays at the MIUs and propagation delays in the satellite link, and result in a significant reduction of data throughput under protocols typically used by DTEs, particularly non-windowing or stop and wait protocols, such as X-protocols.

Mobile User Acceytance

The mobile user hears a ringing tone from the MES MIU 4 when the channel is set up in the example shown in FIG. 5, or the ringing LCM 60 is received. However, this rinaing tone is generated locally by the MES MIU 4 and may not resemble the ringing tone which would be heard from the PSTN 14 if the mobile DTE 2 were instead connected by a conventional modem over the PSTN to the modem 16 and fixed DTE 18.

User acceptance of new communications systems is hampered by perceived differences from the system with which a user is familiar, so that the mobile user may doubt whether a call has been set up if the ringing tone is locally generated and does not vary according to the location of the fixed DTE 18.

Interrupt Sianals

An interrupt signal, such as "break" or "Ctrl-C" is often used during connection to an on-line database, for example to interrupt a long undesired listing from the database. However, no means are provided in the protocols implemented by the MES MIU 4 and the LES MIU 12 in the above example for identifying an interrupt request over the satellite link, or for controlling data flow in that situation.

SUMMARY OF THE INVENTION

According to one aspect of the present invention, there is provided interface apparatus for connection between a data terminal and a communications link which sends data received from the data terminal to the communications link under an HDLC protocol when it has received or sent a connection signal which establishes the parameters call, without sending an HDLC SABME command or an HDLC UA response. In this way, the delay between connection to a remote data terminal and receipt of the data by the remote terminal is reduced.

According to another aspect of the present invention, there is provided interface apparatus for connection between a data terminal and a communications link, which interface is arranged to send a connect command which establishes the parameters of a call, and which requires a response, to the communications link, and to send data received from the data terminal to the communications link before a response to the connect command is received. In this way, data is available at a remote interface as soon as it connects to a remote data terminal in response to the connect command.

According to another aspect of the present invention, there is provided interface apparatus for connection between a data terminal and a communications link, which is arranged to send data from the data terminal to the communications link in a format comprising a frame having a data field including a plurality of subframes each of which comprises only length information and data. In this way, the interface need only delay transmission by one subframe duration, in order to calculate the length information, instead of by a whole SCPC frame duration. In addition, the remote interface can start sending data to a remote data terminal as soon as it is received from the communications link.

According to another aspect of the present invention, there is provided Interface apparatus for connection between a first and a second communications link, which is arranged to receive a ringing signal from the first communications link, to discriminate either the type or the frequency and modulation of the ringing signal, and to send to the second communications link a selected one of a predetermined set of codes in accordance with the discrimination. As a result the ringing tone may be reproduced or indicated at equipment connected to the second communications link.

According to another aspect of the present invention, there is provided an interface between a first communications link and a second communications link, which is arranged to encode an interrupt signal from the first communications link, to send the encoded interrupt signal over the second communications link and to clear data from a data buffer in response to receipt of the interrupt signal.

In this way, Interrupt signals may be sent without delay between communications links.

BRIEF DESCRIPTION OF THE DRAWINGS

Specific embodiments of the present invention will now be described with reference to the accompanying drawings in which:

FIG. 2 is a functional block diagram of a mobile earth station and its associated interface to a data terminal;

FIG. 3 is a functional block diagram of a fixed earth station and its associated interface to a PSTN;

MODES FOR CARRYING OUT THE INVENTION

First Embodiment

Figure 1:
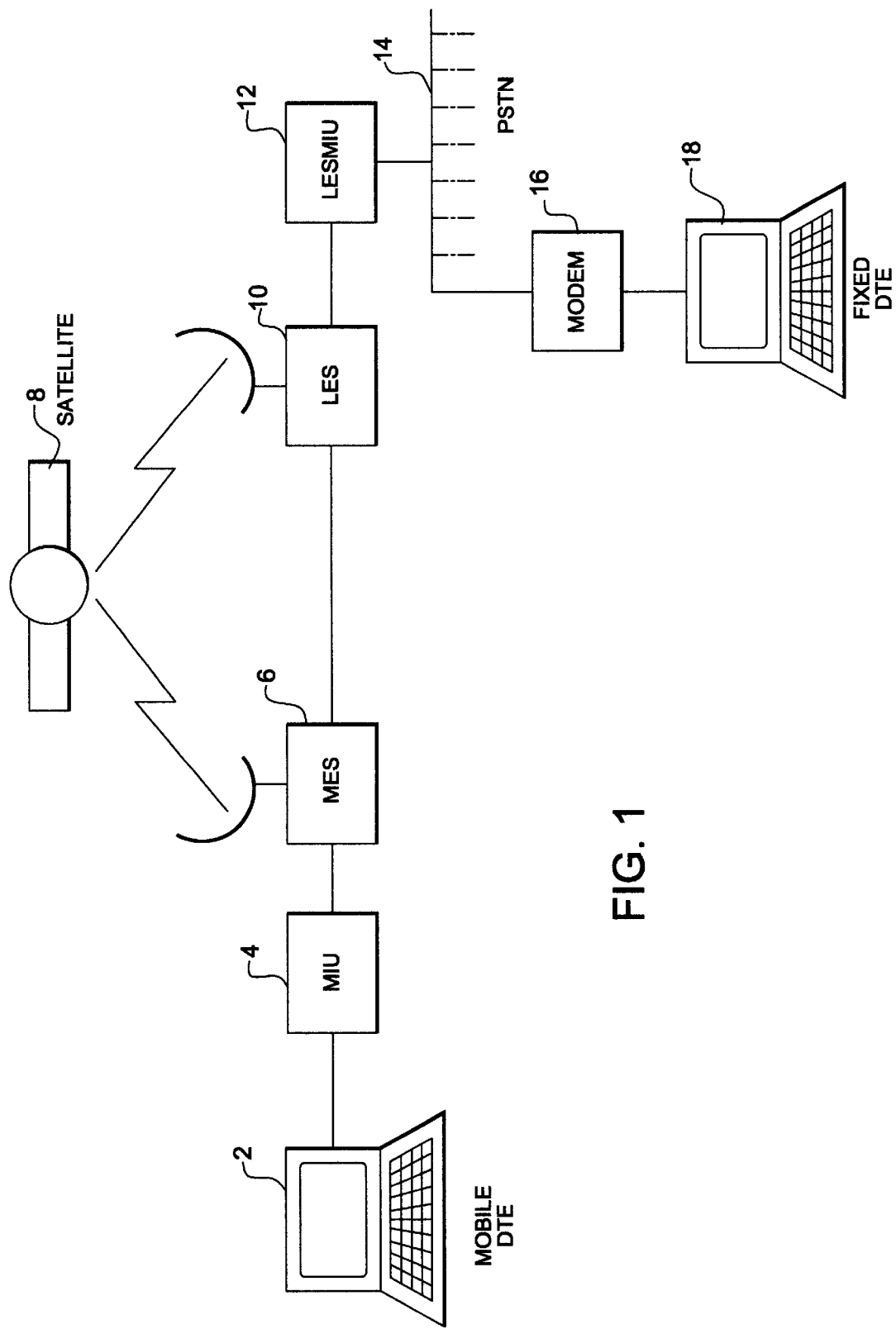
FIG. 1 shows a link between data terminals over a satellite link and a PSTN.
Figure 4:
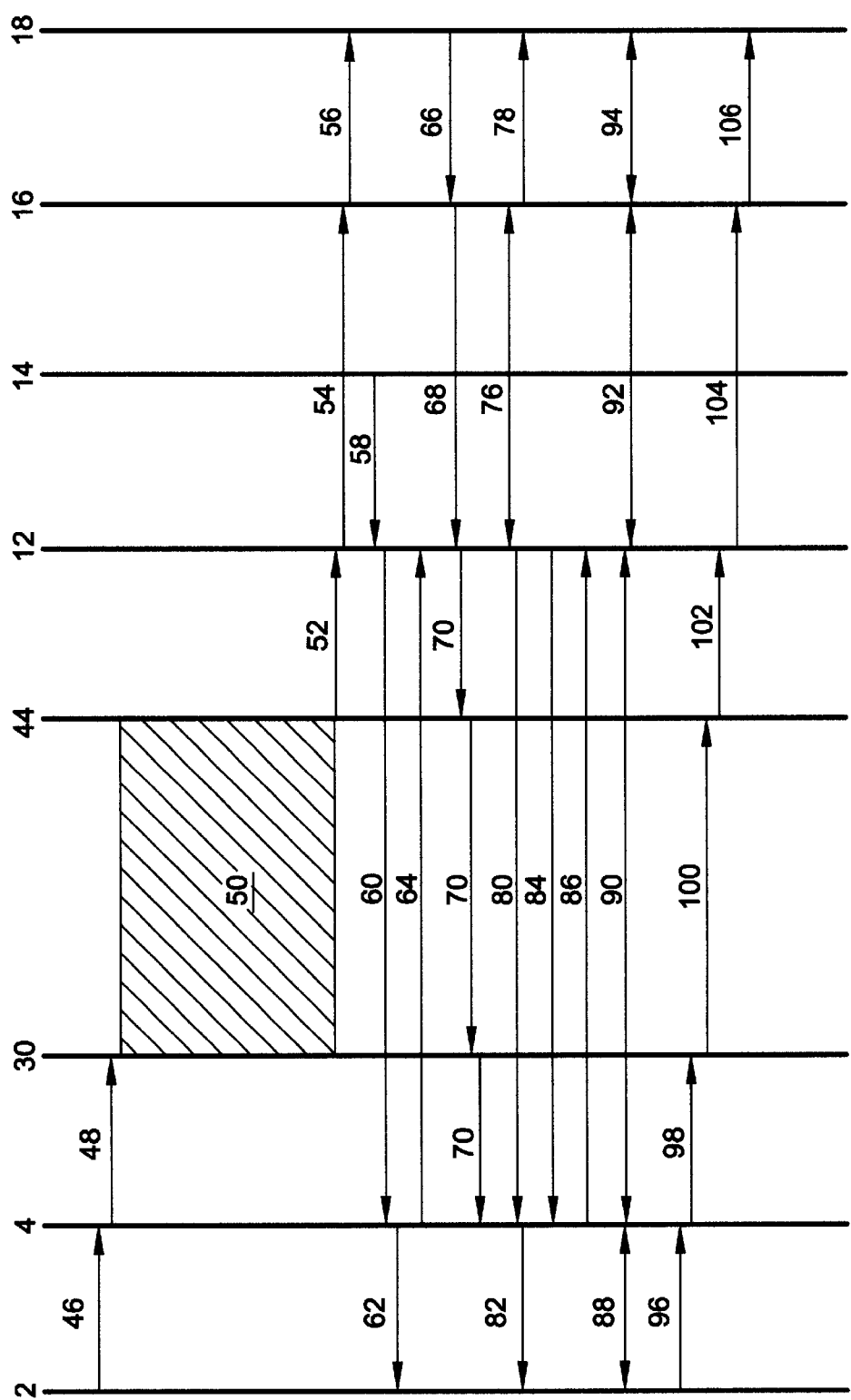
FIG. 4 is a protocol diagram showing a data call originated from a mobile earth station.
Figure 5:
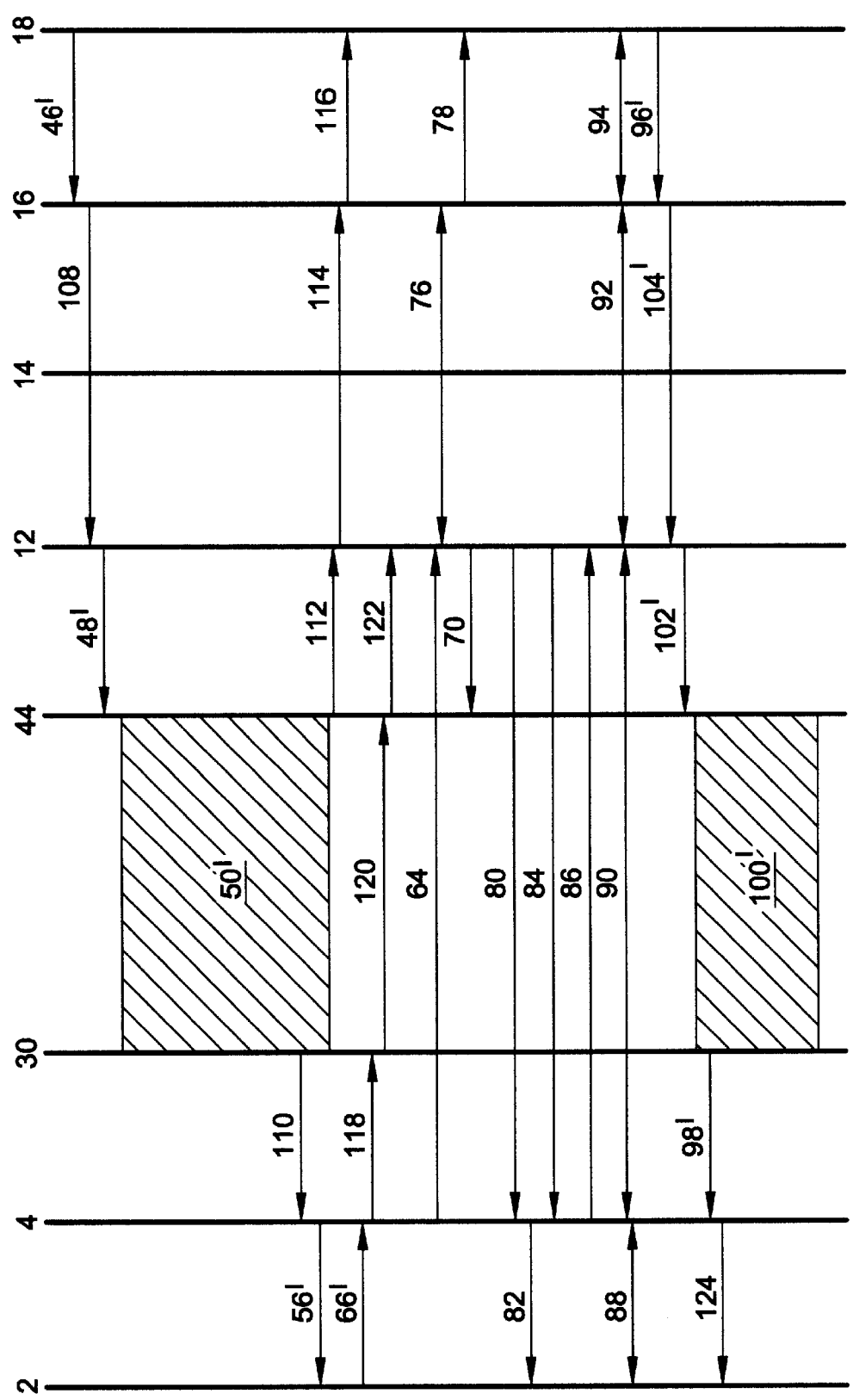
FIG. 5 is a protocol diagram showing a data call originated from a fixed earth station.
Figure 6:
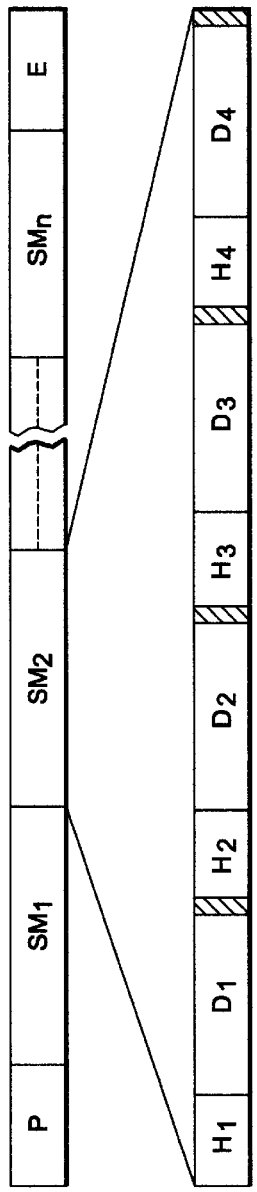
FIG. 6 is a diagram of the format of an SCPC signal sent over the satellite link.
Figure 7:
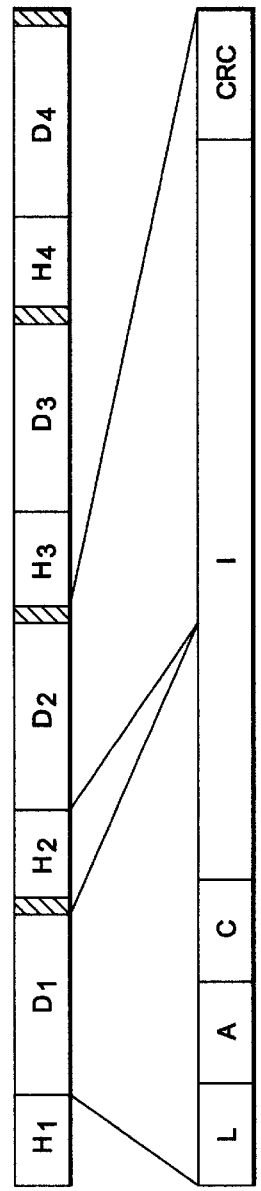
FIG. 7 is a diagram of the format of an HDLC information frame.
Figure 8:
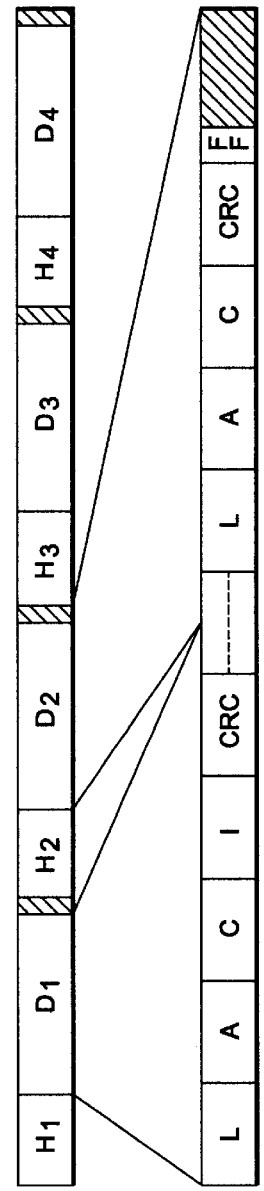
FIG. 8 is a diagram of the format of HDLC unnumbered frames.
Figure 9:
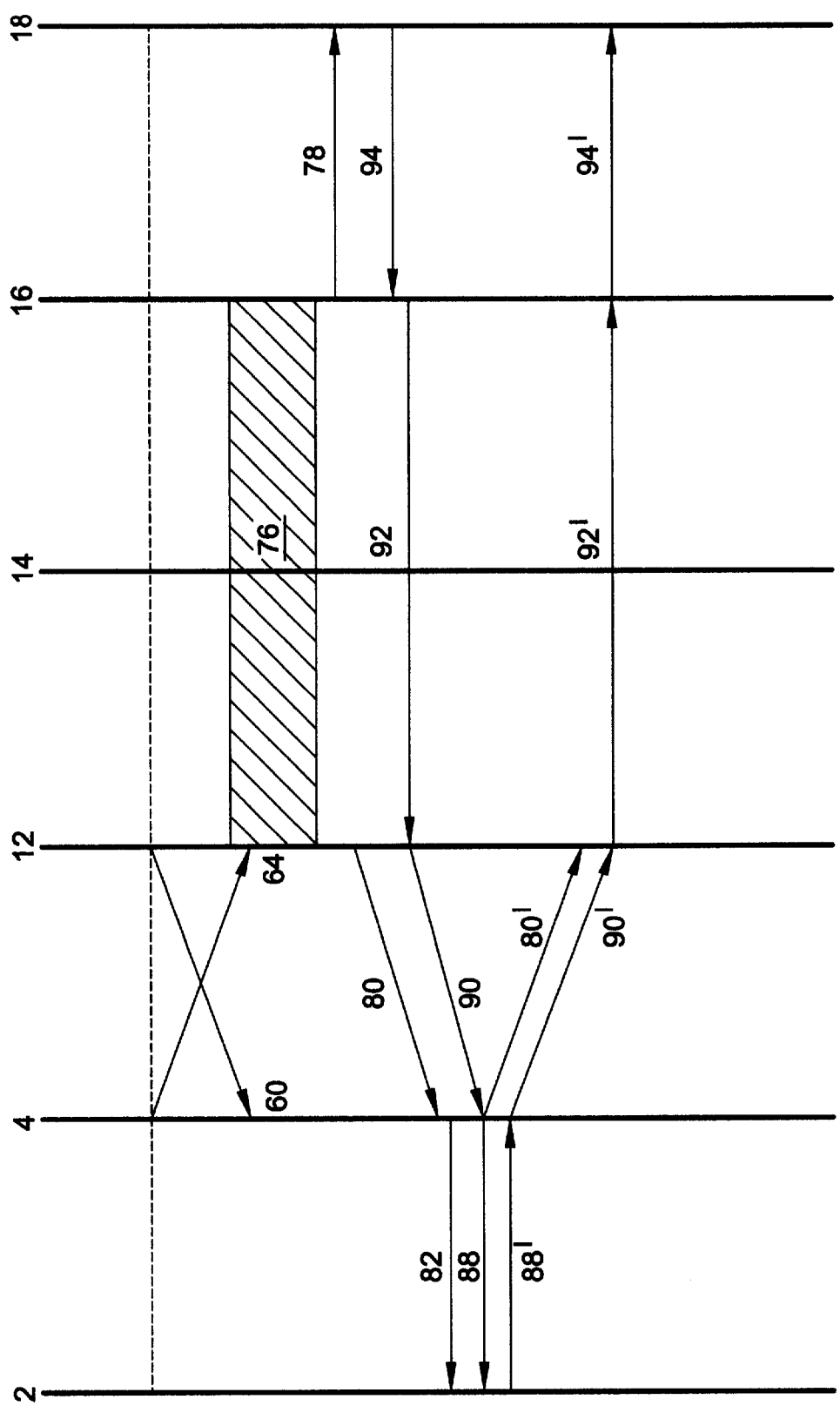
FIG. 9 is a protocol diagram showing a modification to the protocols shown in FIGS. 4 and 5 in a first embodiment of the present invention.
Figure 10:
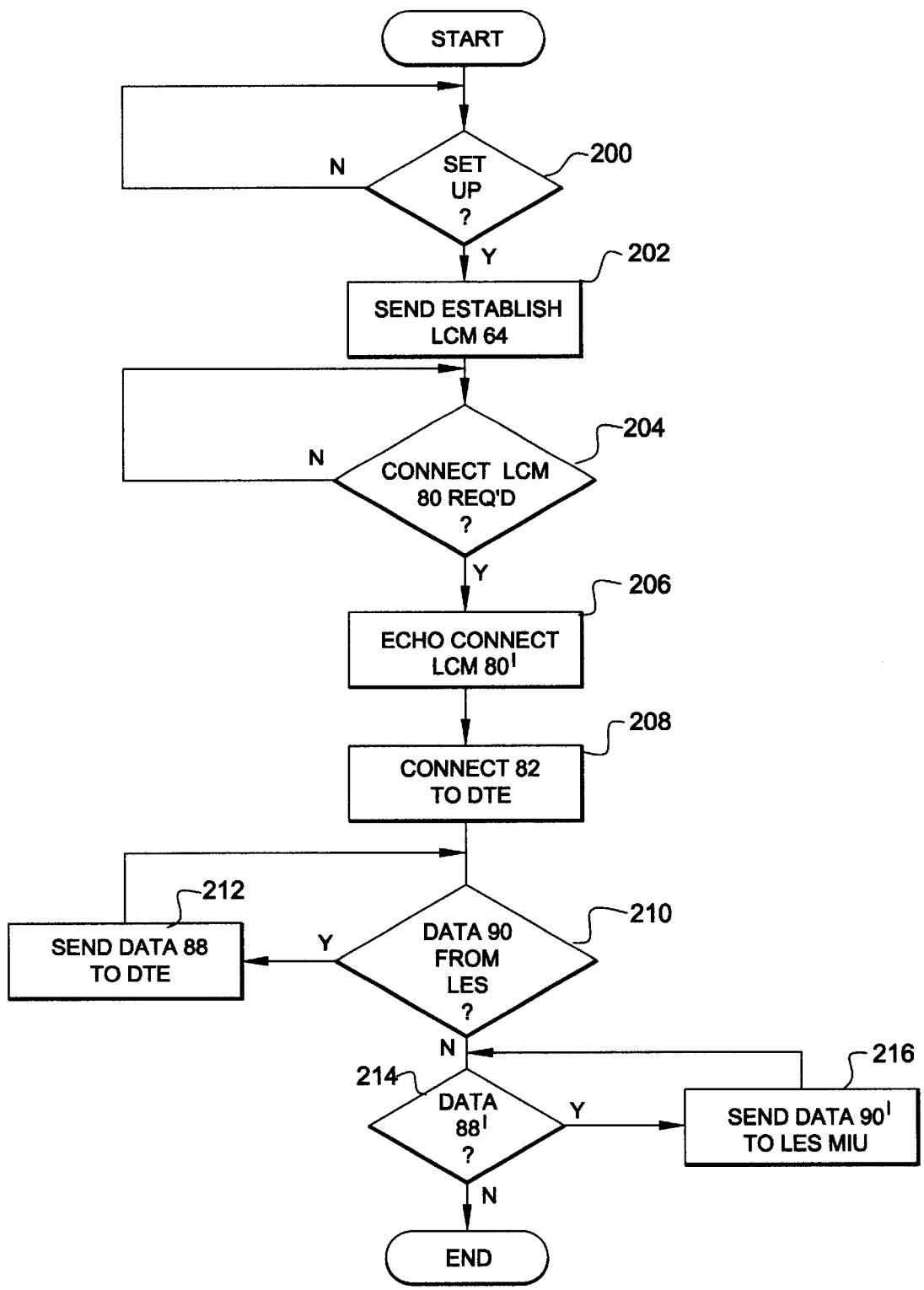
FIG. 10 is a flowchart of the operation of the MES MIU 4 in FIG. 9.
Figure 11:
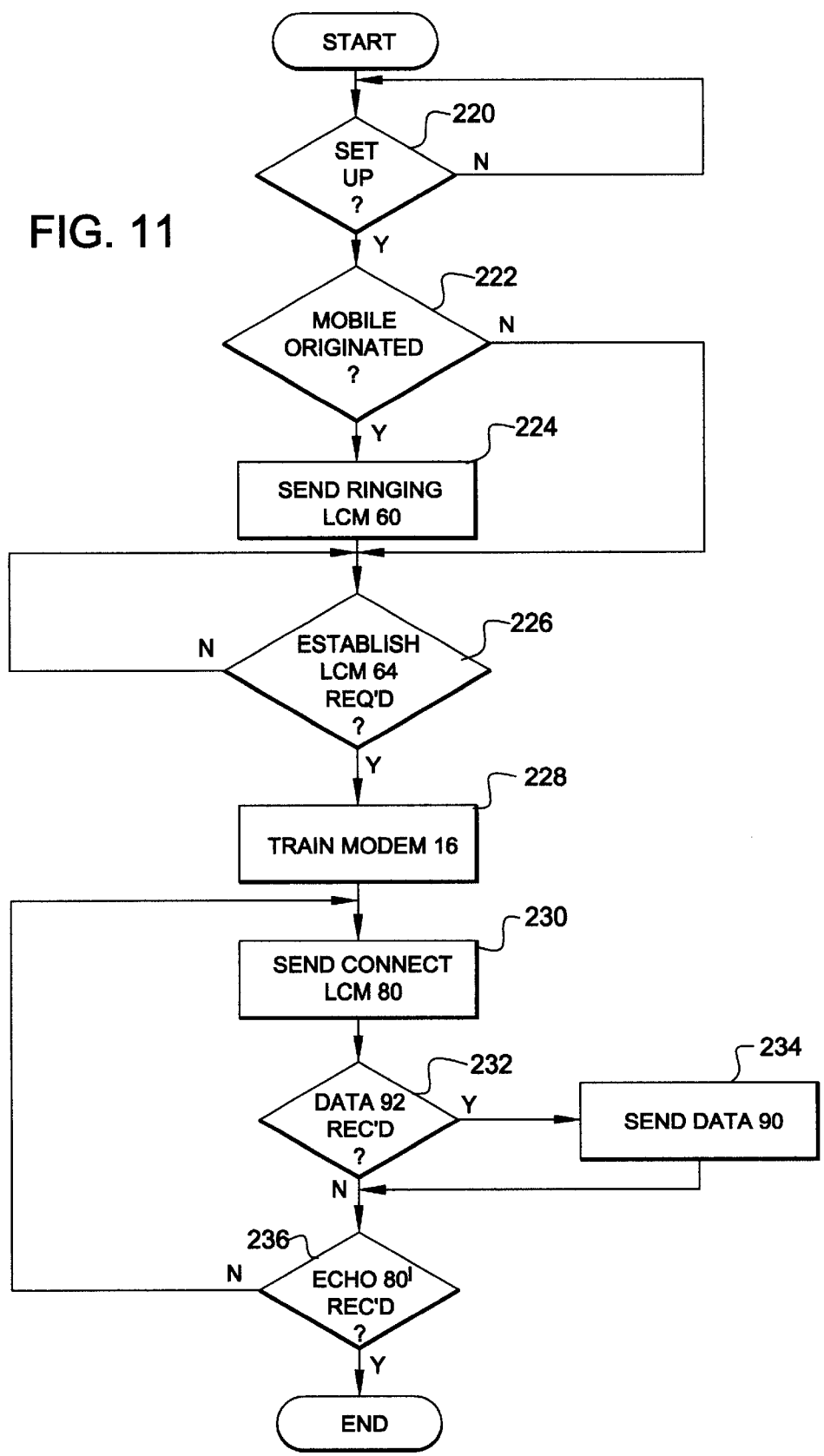
FIG. 11 is a flowchart of the operation of the LES MIU 12 in FIG. 9.

An embodiment of the present invention, which is a modification of the protocol shown in FIGS. 4 and 5, is shown in FIG. 9. The diagram of FIG. 9 replaces the protocol exchange, in the section from the Establish LCM 64 to the data transfer 88, 90, 92 and 94 in FIGS. 4 and 5. The operation of the MES MIU 4 is described with reference to FIG. 10, and the LES MIU 12 with reference to FIG. 11. As soon as the satellite channel has been set up at 50 or 50' (step 200) the MES MIU 4 begins to send the Establish LCM 64 (step 202).

If the MES DTE 2 originated the call (step 222), as in FIG. 4, the LES MIU 12 responds to the channel being set up (step 220) by sending the ringing LCM 60 to the MES MIU 4 (step 224). The LES MIU 12 then awaits receipt of the Establish LCM 64 (step 226) before beginning to train the modem 16 (step 228). Once training 76 is successful, the LES MIU 12 begins to send the Connect LCM 80 (step 230). Meanwhile, the modem 16 sends the connect indication 78 to the fixed DTE 18, which begins to send data 94, 92 to the LES MIU 12. After the LES MIU 12 has sent the Connect LCM 80, the remainder of the SCPC frame SM is vacant. The LES MIU 12 detects whether data has been received over the PSTN 14 (step 210) and, if so, fills the remainder of the SCPC frame SM with the data 90. The MES MIU 4 receives the Connect LCM 80 (step 204) in response to the Establish LCM 64, echoes the Connect LCM 80 to the LES MIU 12 (Step 206) and sends the connect indication 82 to the mobile DTE 2 (step 208). The MES MIU 4 then receives the data 90 (step 210) and sends it as data 88 to the mobile DTE 2 (step 212). The mobile DTE 2 responds to the connect indication 82, by sending data 88' to the MES MIU 4 (step 214), which is sent to the LES MIU 12 (step 216) immediately after the echo 80' to the Connect LCM 80.

The LES MIU 12 continues to repeat the connection LCM 80 (step 230) in every SCPC frame SM, including the data 90 (steps 232, 234), until the echo 80' is received (step 236). Subsequently, the data 90' is sent as data 92' to the modem 16 and as data 94' to the fixed DTE 18. No SABME 84 is sent by the LES MIU 12 or awaited by the MES MIU 4 before data can be sent. The SABME 84 can be dispensed with because it was decided that the MES MIU 4 and LES MIU 12 would always operate in asynchronous balanced mode and therefore there is no longer a need to send the SABME/UA signal and response during call set up, which are required by the HDLC protocols. Data can be received by the DTEs as soon as they receive a connect indication, so that the risk of certain DTE protocols timing out is substantially reduced.

The SABME/UA exchange may, however, be used to reset the satellite data link.

Mini-frames

Figure 12:
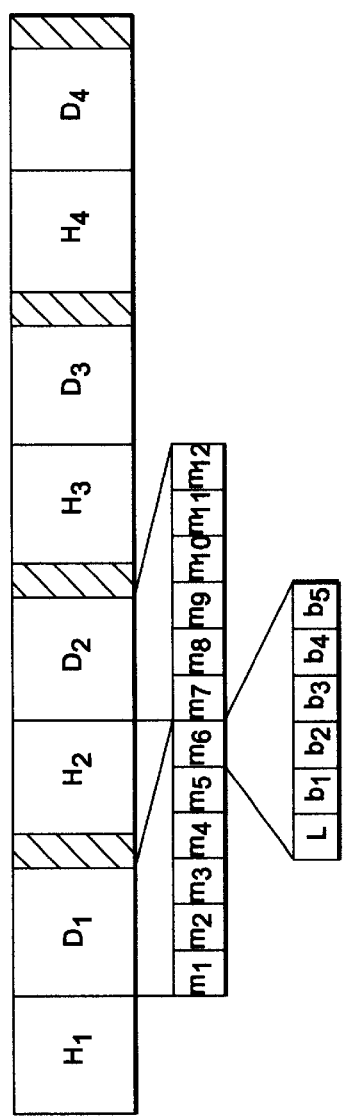
FIG. 12 is a diagram of the format of mini-frames used in a non-ARQ mode in the first embodiment.

A frame format used in this embodiment will now be described with reference to FIGS. 12 to 14.

In a non-ARQ mode, no error recovery procedures are used on the satellite link and it is therefore possible to depart from the HDLC frame format in order to overcome the problems of throughput delay. The HDLC frame format used in non-ARQ mode is shown in FIG. 12.

The data field $D_1$ comprises six mini-frames $m_1$ to $m_6$ and the data field $D_2$ comprises six further mini-frames $m_7$ to $m_{12}$. The mini-frames are repeated in data fields $D_3$ and $D_4$. Each mini-frame m comprises 6 bytes, consisting of a length byte L and five data bytes $b_1$ to $b_5$. The contents of each mini-frame m are as shown in Table 1 below.

TABLE 1

| Type | L | b1 | b2 | b3 | b4 | b5 |
|---|---|---|---|---|---|---|
| I | FA | | | | | |
| | 50 | * | | | | |
| | 5F | * | * | | | |

TABLE 1-continued

| Type | L | b1 | b2 | b3 | b4 | b5 |
|---|---|---|---|---|---|---|
| | 93 | * | * | * | | |
| | A0 | * | * | * | * | |
| | 6C | * | * | * | * | * |
| UI | 05 | Address | Control | Info | CRC | CRC |

An information (I) type mini-frame m may include from zero to five bytes of valid data, and the number of valid bytes is indicated by the relevant hex code for the length byte L shown in Table 1. No CRC, address or control bytes are included. The I type mini-frame is used to carry user data.

An unnumbered information (UI) type mini-frame m has the length byte L set at "05", and includes an address byte $b_1$, a control byte $b_2$, an information byte $b_3$ and two CRC bytes $b_4$ and $b_5$. The UI type mini-frame is used to send line control messages (LCMs), which are encoded in the information byte $b_3$, as shown in Table 2 below.

TABLE 2

| Command/Response | Ack type | bit 7 | bit 6 | bit 5 | bit 4 | bit 3 | bit 2 | bit 1 | bit 0 |
|---|---|---|---|---|---|---|---|---|---|
| Connection at 1200 bps without ARQ (from LES) | 2 | 1 | 1 | 1 | 0 | 0 | 0 | 0 | 0 |
| Connection at 2400 bps without ARQ (from LES) | 2 | 1 | 1 | 1 | 1 | 0 | 0 | 0 | 0 |
| ringing (from LES) | 3 | 0 | 0 | 0 | 0 | 0 | 0 | 1 | 1 |
| Break (both) | 3 | 0 | 0 | 0 | 0 | 0 | 1 | 0 | 0 |

The heading "Ack Type" in Table 2 above refers to the type of acknowledgement required for that LCM. A Type 2 LCM is repeated until an echo is received or until a timer times out; the Connect LCM 80 is an example of this. A Type 3 LCM is sent only once and is echoed by the remote MIU. A Type 1 LCM (not shown in Table 2) is repeated until it is acknowledged by a different LCM; the Establish LCM 64 is an example if this. The establish LCM 64 is not encoded in a mini-frame, since it is sent before non-ARQ mode can be established.

When encoding data into mini-frames, an MIU need only assemble enough data for one mini-frame, in order to calculate the length code L, before sending that mini-frame, in contrast to the normal HDLC information frame for which 66 bytes must be assembled and the CRC calculated before the data can be sent. I and UI mini-frames can be accommodated within the same SCPC frame. In the protocol shown in FIG. 9, this feature allows data 90 to be sent immediately after the Connect LCM 80.

If less than five bytes of data are available for formatting at an MIU, the number of bytes available will be formatted in a mini-frame and the length byte L will be set accordingly. The remaining bytes are filled with random bits.

In normal operation, when connection is achieved at 2400 bit/s, the satellite link, the link between the MES DTE 2 and the MES MIU 4 and the link between the LES MIU 12 and the modem 16 operate at nominally the same rate. However, the links are in fact plesiochronous, since there is no means provided for synchronising them.

If the data input rate to an MIU from the local DTE exceeds the output rate of the MIU to the satellite link, the excess data will be buffered until the buffer 22 or 34 is full, whereupon flow control signals are sent back to the local DTE. If the data rate from the local DTE is less than the output rate to the satellite link, mini-frames will be sent with less than five bytes per mini-frame.

Call Progress Indication

The format of the ringing LCM 60 will now be described with reference to FIG. 13. In this example, the LES MIU 12 has not yet received the Establish LCM 64 and ARQ or non-ARQ mode are not established so that standard HDLC frames or mini-frames are not used.

Figure 13:
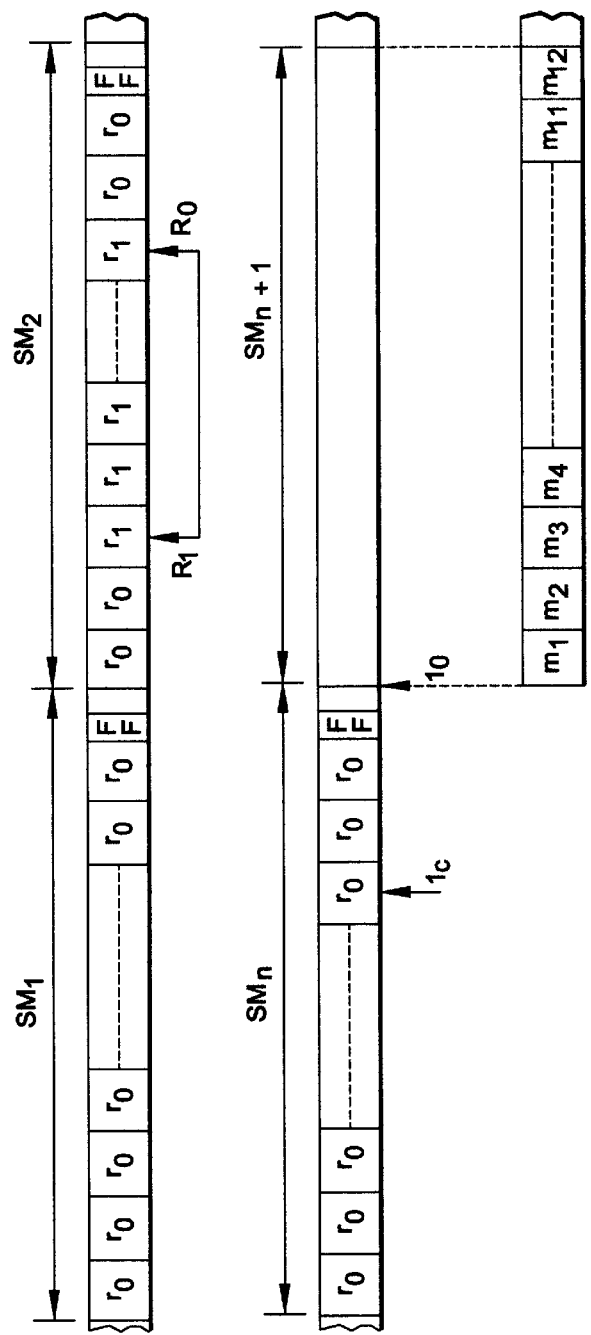
FIG. 13 is a diagram of the format of the ringing LCM 60 in the first embodiment.

FIG. 13 shows a sequence of SCPC frames sent by the LES MIU 12 from the point at which a data mode channel is set up. The SCPC frames are subdivided into UI ringing frames r which indicate whether a ringing tone is present on the PSTN 14, and are terminated by a hex FF byte. Ring on frames $r_1$ indicate ringing, whilst ring off frames r. indicate no ringing. Thus, in frame $SM_2$, the frames begin as $r_0$, change to $r_1$ at point $R_1$ where ringing begins and revert to $r_0$ at point $R_0$ where ringing ends.

If the ringing tone from the PSTN 14 is repeated, the frames $r_1$ are again transmitted by the LES MIU 12 while the tone is present. The LES MIU 12 continues to sending ring off frames $r_0$ during receipt of the answer signal 68 and modem training 76, which is completed at point $T_c$. From the beginning of the next SCPC frame $SM_{n+1}$, at $T_0$, the LES MIU 12 uses standard HDLC frames in ARQ mode or mini-frames in non-ARQ mode, depending on the error recovery mode established by the Establish LCM 64.

In ARQ mode, the frame $SM_{n+1}$ comprises a standard HDLC unnumbered frame containing the Connect LCM 80 and optionally one or more I frames, while in non-ARQ mode the frame $S_{n+1}$ comprises mini-frames $m_1$ to $m_{12}$ including the Connect LCM 80 and optionally one or more I frames containing any available data.

The MES MIU 4 receives the ringing frames r and signals the ringing indication 62 to the mobile DTE 2 in response to onset of the ring on frames $r_1$. The MES MIU 4 includes an audible tone generator which is activated by the ring on frames $r_1$ and therefore reproduces the cadence of the ringing signal from the PSTN 14. This reassures the user that the ringing tones actually represent ringing at the PSTN 14.

In one embodiment, the LES MIU 12 analyses the frequency and tone modulation of the ringing tone 58 and encodes these in the ring on frames $r_1$. The MES MIU 4 decodes the frequency and modulation and activates the audible tone generator to reproduce the ringing tone 58 accurately.

In another embodiment, as well as encoding ringing signals, the LES MIU 12 also encodes "busy" and "unobtainable" signals received from the PSTN 14, so that the mobile user gains more complete information on call progress at the PSTN 14.

The LES MIU 12 compares the signals from the PSTN 14 with known "ringing", "busy" and "unobtainable" signals and selects a corresponding code for sending the MES MIU 4. The code is sent in a UI frame, in the same way as the ring on frames $r_1$.

Alternatively, if the PSTN 14 is of the type which generates sub-band call progress signals instead of call progress tones, the LES MIU 12 may generate a corresponding code directly in response to the sub-band call progress signals without detecting their duration or frequency.

An additional advantage of encoding the type of the call progress signals is that the MES DTE 2 may display the call progress status, so that the user does not have to recognize what status is meant by the reproduced tones.

Interrupt Signals

A DTE user wishing to interrupt the progress of a data call may enter a "break" command at the DTE. It is important that the "break" command should reach the remote DTE as soon as possible, since it usually indicates that unwanted data is being received or the user wishes to terminate the call abruptly. Therefore, when the LES MIU 12 receives a "break" command from the fixed DTE 18 over the PSTN 14, or the MES MIU 4 receives a "break" command from the mobile DTE 2, it discards any buffered data awaiting transmission over the satellite link and sends a break signal in the next frame as an LCM. The format of a mini-frame break LCM is shown in Tables 1 and 2 above, for sending in non-ARQ mode.

In ARQ mode, the break signal is sent in an unnumbered HDLC frame. The receiving MIU receives the break signal over the satellite link and transmits a break command to the local DTE immediately, discarding any buffered data to be sent to the local DTE. In this way, break commands can be sent rapidly to the remote DTE. As well as "break" commands, other interrupt commands such as "Ctrl-C" may be encoded and the buffers cleared in the same way.

The above embodiments have been described with reference to the Inmarsat-M™ asynchronous data service. However, the embodiments may be applied to the Inmarsat-B™ asynchronous data service, with certain modifications described below. The Inmarsat-B™ system s capable of data rates of up to 9600 bit/s and therefore different signal formats, frame lengths and parameter codes are needed.

Second Embodiment

Figure 14:
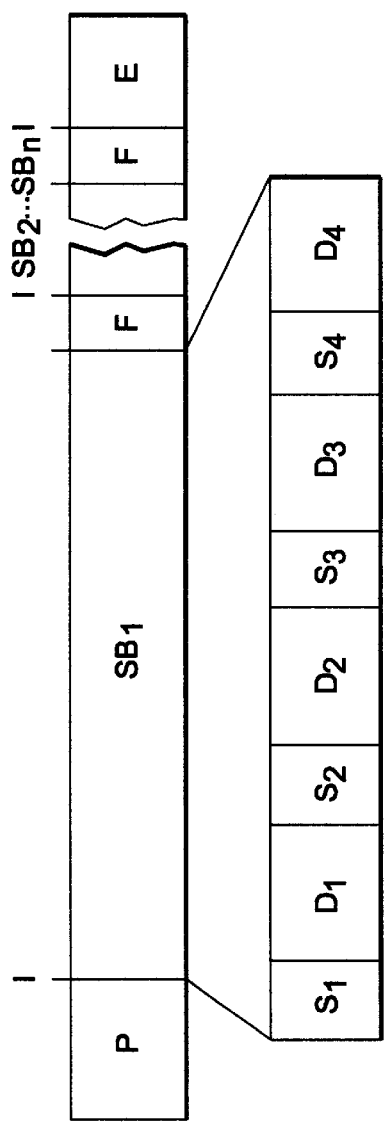
FIG. 14 is a diagram of the format of an SCPC signal in a second embodiment of the present invention.

FIG. 14 shows the format of an Inmarsat-B™ signal on a single RF channel. The signal begins with a header portion P, followed by SCPC frames $SB_1$ to $SB_n$ and terminated by an end signal E.

Each SCPC frame contains 1872 bits and has a duration of 80 ms; it is subdivided into four data fields $D_1$ to $D_4$ each preceded by a sub-band signalling field $S_1$ to $S_4$. Data fields $D_3$ and $D_4$ do not repeat data fields $D_1$ and $D_2$, but contain additional data.

Figure 15:
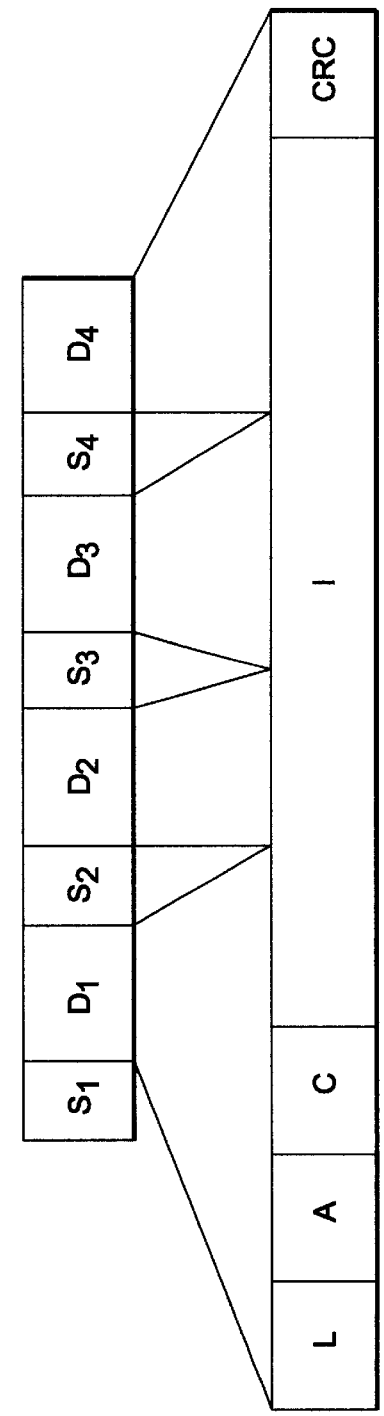
FIG. 15 is a diagram of the format of the HDLC information frame used in ARQ mode in the second embodiment.

FIG. 15 shows the contents of the data fields $D_1$ to $D_4$ concatenated to form an HDLC information (I) frame, comprising a length byte L, address byte A, control byte C, variable length data I up to a maximum of 98 bytes, and a two-byte CRC. The length byte L indicates the position of the CRC and any remaining bytes after the CRC are filled with random bits.

Figure 16:
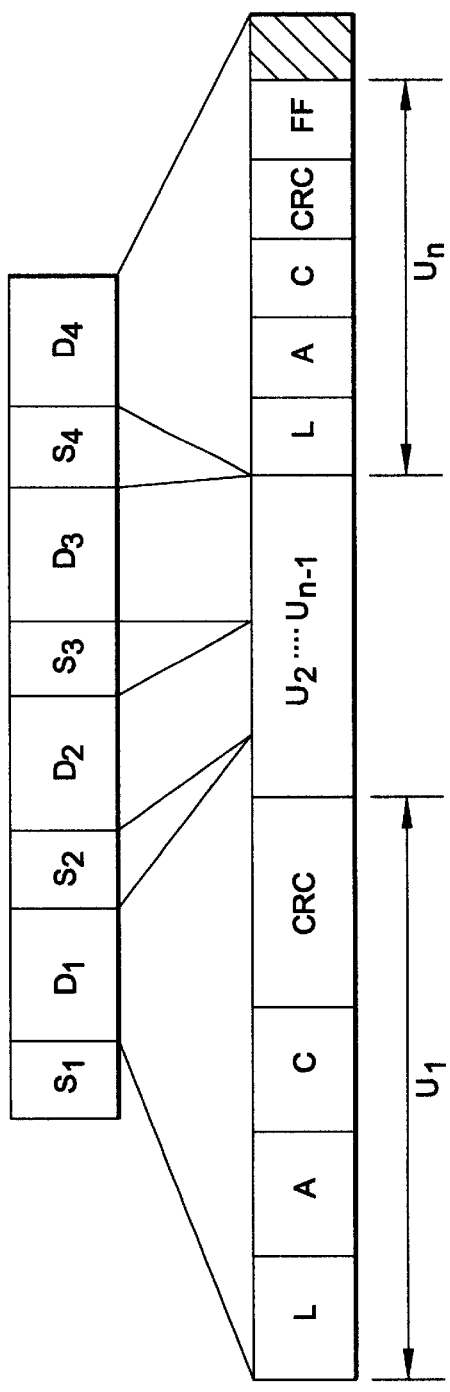
FIG. 16 is a diagram of the format of HDLC unnumbered frames used in ARQ mode.

In the format shown in FIG. 16, the contents of the data fields $D_1$ to $D_4$ are concatenated at the receiving MIU to form one or more unnumbered information (UI) HDLC frames $U_1$ to $U_n$. Each UI frame comprises a length byte L, an address byte A, a control byte C, an optional information field I and two CRC bytes. After ne last frame $U_n$, a byte is set to hex FF and the remaining available bytes are filled with random bits. Each UI frame may carry an LCM.

Figure 17:
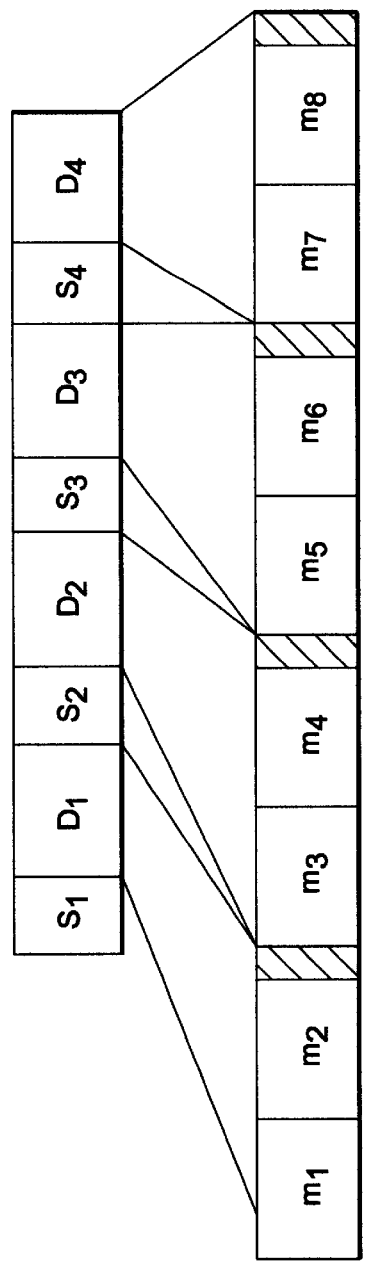
FIG. 17 is a diagram of the format of mini-frames used in non-ARQ mode.

FIG. 17 shows the format of mini-frames m used for Inmarsat-B™. Each data field D contains two mini-frames of 13 bytes each, with the last two bits of the data field D being unused. The format of each mini-frame m depends on the type of the mini-frame, as shown in Table 3 below.

TABLE 3

| Type | L | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ |
|---|---|---|---|---|---|---|---|---|---|---|---|---|---|
| 1 | AF | | | | | | | | | | | | |
| 1 | 3A | * | | | | | | | | | | | |
| 1 | CA | * | * | | | | | | | | | | |
| 1 | F6 | * | * | * | | | | | | | | | |
| 1 | F9 | * | * | * | * | | | | | | | | |
| 1 | C6 | * | * | * | * | * | | | | | | | |
| 1 | F5 | * | * | * | * | * | * | | | | | | |
| 1 | OA | * | * | * | * | * | * | * | | | | | |
| 1 | 39 | * | * | * | * | * | * | * | * | | | | |
| 1 | 9A | * | * | * | * | * | * | * | * | * | | | |
| 1 | E2 | * | * | * | * | * | * | * | * | * | * | | |
| 1 | FC | * | * | * | * | * | * | * | * | * | * | * | |
| 1 | 7B | * | * | * | * | * | * | * | * | * | * | * | * |
| U1 | 05 | A | C | 1 | CRC | CRC | FF | random | random | random | random | random | random |

An information (I) type mini-frame has one length byte L and twelve data bytes $b_1$ to $b_{12}$. The length byte L indicates the number of valid data bytes b, as in the first embodiment, with any unused bytes containing random bits. An unnumbered information (UI) type mini-frame uses only bytes $b_1$ to $b_5$. Byte $b_6$ contains hex FF, while bytes $b_7$ to $b_{12}$ contain random bits. The information I carried in byte $b_3$ is shown in Table 4 below.

TABLE 4

| Command/Response | Ack type | bit 7 | bit 6 | bit 5 | bit 4 | bit 3 | bit 2 | bit 1 | bit 0 |
|---|---|---|---|---|---|---|---|---|---|
| Connection at 1200 bps without ARQ (from the CES) | 2 | 1 | 1 | 1 | 0 | 0 | 0 | 0 | 0 |
| Connection at 2400 bps without ARQ (from the CES) | 2 | 1 | 1 | 1 | 1 | 0 | 0 | 0 | 0 |
| Connection at 4800 bps without ARQ (from the CES) | 2 | 1 | 1 | 1 | 1 | 0 | 0 | 0 | 0 |
| Connection at 9600 bps (or greater) without ARQ (from CES) | 2 | 1 | 1 | 1 | 1 | 0 | 0 | 0 | 0 |
| Break (both) | 3 | 0 | 0 | 0 | 0 | 0 | 1 | 0 | 0 |

In the Connect LCM 80, data rates of 1200, 2400, 4800 or 9600 bit/s may be indicated, which are the data rates supported by Inmarsat-B™. The acknowledge type corresponds to the zype described above with reference to Table 2.

In the above description, the modem interface units may either be separate units from the DTEs and earth stations or may be integrated with their respective earth stations. Furthermore, the mobile DTE 2, the MES MIU 4 and the MES 6 may all be incorporated in a single mobile unit.

The MES MIU 4 and the MES 6 may be a fixed installation and may serve a local network which connects many DTEs to the MES MIU 4. The PSTN 14 may be replaced by a local network. These and other variants are well-known to the skilled person.

The present invention is not limited to data service systems of the inmarsat-M™, Inmarsat mini-M™ or Inmarsat-B™ type. Instead, the skilled person will recognise that the protocols and formats described may be applied to other communications systems having interfaces between communications links conforming to different standards, and in particular systems in which delay may be incurred by the protocols or formats implemented by such interfaces or in which it is desirable to emulate call progress tones from conventional single links in such systems or in which break signals must be handled without delay.

The present invention may advantageously be applied to a communications system including a satellite link, but is also applicable to terrestrial cellular communications systems, and other systems including a terrestrial radio frequency link or other types of link.

What is claimed is:

1. A method of operating a first data communications interface connected between a first data terminal and a digital radio frequency communications link to a second data communications interface connectable to a second data terminal, comprising:

receiving from the second data communications interface via the digital radio frequency communications link a connection control signal which sets a data communication mode of the first and second terminals; and sending data received from the first data terminal to the second data terminal via the digital radio frequency communications link in response to receipt of said connection control signal.

2. A method of operating a second data communications interface connected between a second data terminal and a digital radio frequency communications link to a first data communications interface connectable to a first data terminal, comprising:

(a) sending to the first data communications interface via the digital radio frequency communications link a connection control signal which sets a data communication mode of the first and second data terminals; and (b) sending data received from the second data terminal to the first data terminal via the digital radio frequency communications link in response to the completion of step (a).

3. A method as claimed in claim 2, comprising:

repeating steps (a) and (b) until a confirmation signal, which indicates receipt of the connection control signal by the first data communications interface, is received from the first data communications interface via the digital radio frequency communications link.

4. A method as claimed in any preceding claim, wherein the first data communications interface is operable in HDLC asynchronous balanced mode for communication with the second data communications interface over the digital radio frequency communications link.

5. A method as claimed in any one of claims 1, 2, and 3, wherein the digital radio frequency communications link comprises a satellite link.

6. A first data communications interface apparatus for connection between a first data terminal and a digital radio frequency communications link to a second data communications interface connectable to a second data terminal, comprising:

means for receiving data from the first data terminal;

means for detecting receipt from the second data communications interface via the digital radio frequency communications link of a connection control signal for setting a data communication mode of the first and second data terminals; and means for sending said received data to the second data terminal via the digital radio frequency communications link in response to the detection of said connection control signal.

7. A second data communications interface apparatus for connection between a second data terminal and a digital radio frequency communications link to a first data communications interface connectable to a first data terminal, comprising:

means for sending to the first data communications interface via the digital radio frequency communications link a connection control signal for setting a data communication mode of the first and second data terminals;

means for receiving data from the second data terminal; and means arranged to send said received data to the first data terminal via the digital radio frequency communications link in response to the completion of sending of the connection control signal.

8. Apparatus as claimed in claim 7, further comprising means for detecting receipt of a confirmation signal from the first data communications interface via the digital frequency communications link, wherein said means for sending the connection control signal is arranged to repeat the sending of the connection control signal, and the means arranged to send the received data is arranged to repeat the sending of the received data, until receipt of said conformation signal is detected, said confirmation signal being indicative of receipt of the connection control signal by the first data communications interface via the digital radio frequency communications link.

9. Apparatus as claimed in any one of claims 6 to 8, operable in HDLC asynchronous balanced mode for communication with the first data communications interface over the digital radio frequency communications link.

10. A first data communications interface apparatus for connection between a first data terminal and a digital radio frequency communications link to a second data communications interface connectable to a second data terminal, comprising:

a receiver that receives data from the first data terminal;

a detector that detects receipt from the second data communications interface via the digital radio frequency communications link of a connection control signal for setting a data communication mode of the first and second data terminals; and a transmitter that sends said received data to the second data terminal via the digital radio frequency communications link in response to the detection of said connection control signal.

11. A second data communications interface apparatus for connection between a second data terminal and a digital radio frequency communications link to a first data communications interface connectable to a first data terminal, comprising:

a first transmitter that sends to the first data communications interface via the digital radio frequency communications link a connection control signal for setting a data communication mode of the first and second data terminals;

a receiver that receives data from the second data terminal; and a second transmitter that sends said received data to the first data terminal via the digital radio frequency communications link in response to the completion of sending of the connection control signal.

* * * * *

UNITED STATES PATENT AND TRADEMARK OFFICE
CERTIFICATE OF CORRECTION

PATENT NO.    : 6,278,696 B1  
DATED         : August 21, 2001  
INVENTOR(S)   : Howard Feldman et al.

It is certified that error appears in the above-identified patent and that said Letters Patent is hereby corrected as shown below:

Title page,
Item [56], References Cited, U.S. PATENT DOCUMENTS,
```
-- 5,311,509   5/94    Heddes, et al.
   5,159,591   10/92   Gohara, et al.
   4,539,692   9/85    Munter
   4,534,041   8/85    Munter
   4,442,485   4/84    Ota, et al.
   4,254,464   3/81    Byrne
   4,535,454   8/85    Buzzard, et al. -- has been inserted.
```

Item [56], References Cited, FOREIGN PATENT DOCUMENTS,
```
-- 2182528    Great Britain   5/87
   2286746    Great Britain   8/95
   0068991    Europe          1/83
   2264845    Great Britain   9/93
   243748     Great Britain   11/25
   2101776    Great Britain   1/83
   0471354    Europe          2/92
   0019920    Europe          12/80
   94/27393   WIPO            11/94
   94/28664   WIPO            12/94
   94/16510   WIPO            7/94
   94/11970   WIPO            5/94 -- has been inserted.
```

Item [56], References Cited, OTHER PUBLICATIONS,
-- ATM, L.G. Cuthhert and J-C Sapanel, IEE London 1993 -- has been inserted.

Signed and Sealed this

Third Day of September, 2002

*Attest:*

*Attesting Officer*

JAMES E. ROGAN  
*Director of the United States Patent and Trademark Office*